United States Patent [19]

Shimotashiro et al.

[11] Patent Number: 5,258,879
[45] Date of Patent: Nov. 2, 1993

[54] TRACKING ERROR DETECTION CIRCUIT OF MAGNETIC RECORDING AND REPRODUCTION APPARATUS FOR DETERMINING TRACKING ERROR BASED ON PILOT SIGNALS RECORDED ON A RECORDING MEEDIUM

[75] Inventors: Masafumi Shimotashiro, Neyagawa; Kiyokazu Hashimoto, Matsubara; Makoto Gotou, Nishinomiya; Haruo Isaka, Yawata; Kei Ichikawa, Osaka; Kenichi Honjo, Kobe; Akihiro Takeuchi, Ikoma; Yoshio Sakakibara, Neyagawa, all of Japan

[73] Assignee: Matsushita Electric Industrial Co., Inc., Osaka, Japan

[21] Appl. No.: 832,711

[22] Filed: Feb. 7, 1992

[30] Foreign Application Priority Data

Feb. 13, 1991 [JP] Japan ................................ 3-019809
Mar. 4, 1991 [JP] Japan ................................ 3-037238
Jul. 2, 1991 [JP] Japan ................................ 3-161539
Jul. 9, 1991 [JP] Japan ................................ 3-168148
Jul. 9, 1991 [JP] Japan ................................ 3-168149
Jul. 30, 1991 [JP] Japan ................................ 3-189895
Sep. 3, 1991 [JP] Japan ................................ 3-222650

[51] Int. Cl.$^5$ ............................................. G11B 5/584
[52] U.S. Cl. ............................ 360/77.140; 360/77.01; 360/77.15
[58] Field of Search ................. 360/77.120, 77.130, 360/77.140, 77.150, 77.160, 77.010, 77.070, 77.080, 77.110

[56] References Cited

U.S. PATENT DOCUMENTS 4,416,002 11/1983 Oguino et al. .............. 360/77.07 X
4,558,382 12/1985 Edakubo et al. .............. 360/77.15
4,811,129 3/1989 Kubo ...................... 360/227.15 X
4,951,162 8/1990 Yoshimura et al. .............. 360/77.14
5,168,487 12/1992 Ohsata et al. ................ 369/44.37

FOREIGN PATENT DOCUMENTS 0094194 11/1983 European Pat. Off. ........... 360/77.1
0219303 4/1987 European Pat. Off. .
0227468 7/1987 European Pat. Off. ......... 360/78.15

61-271645 12/1986 Japan .
259541 2/1987 Japan ...................................... 360/77
62-076043 4/1987 Japan .

OTHER PUBLICATIONS

Hirota, "With Respect to the 8 mm Video Tape Recorder (1)," Technical Report of Japan Society of Television, VR61-1, pp. 1-6, Feb. 23, 1984.
Patent Abstracts of Japan, vol. 11, No. 129, (P-570), Jan. 12, 1986 & JP 61-271645.
Patent Abstracts of Japan, vol. 11, No. 279, (P-614), Apr, 8, 1987 & JP 62-076043.
Patent Abstracts of Japan, vol. 2, No. 436, (P-787) Jul. 7, 1988 & JP 63-164058.

Primary Examiner—Aristotelis Psitos
Assistant Examiner—Duncan Wilkinson
Attorney, Agent, or Firm—Stevens Davis, Miller & Mosher

[57] ABSTRACT

A tracking error detecting circuit in which tracking error detecting pilot signals having different frequencies are added to a main signal every track and recorded onto a magnetic recording medium, and upon reproduction, reproduction output levels of the pilot signals reproduced as crosstalks from both of adjacent tracks are compared, and a tracking error is detected. n signals having the same frequencies as those of the pilot signals and whose phases are different are generated and multiplied to the reproduction signal. Unnecessary components are eliminated by n LPFs (Lowpass filters). The amplitude values of the reproduced pilot signals are vector separated and detected. Further, the vector separated amplitude values are vector synthesized and detected. Therefore, by multiplying the signals having the same frequencies as those of the pilot signals, the synchronous detection is performed. The influence due to the undetected pilot phases is solved by detecting by performing the vector separation and synthesis. Therefore, the amplitude values can be certainly detected by the synchronous detection. The signal to noise ratio of the reproduction pilot signals can be determined by the LPFs (lowpass filters). Even in the case of a bad transmission signal to noise ratio of the reproduction pilot signals which could not be coped by the conventional construction, the amplitude values can be certainly detected.

12 Claims, 14 Drawing Sheets

$f_0 \neq f_1 \neq f_2$
▯ : PILOT

PHASE $\theta$ OF INPUT PILOT SIGNAL

T : PERIOD m : n = 1 : 2

T : PERIOD

TRACKING ERROR DETECTION CIRCUIT OF MAGNETIC RECORDING AND REPRODUCTION APPARATUS FOR DETERMINING TRACKING ERROR BASED ON PILOT SIGNALS RECORDED ON A RECORDING MEEDIUM

BACKGROUND OF THE INVENTION

1. Field of the Invention

The invention relates to a tracking error detecting circuit of a magnetic recording and reproducing apparatus in which pilot signals to detect a tracking error are recorded together with a main signal onto a magnetic recording medium and, upon reproduction, the tracking error is detected from reproduction output levels of the pilot signals.

2. Description of the Related Art

Hitherto, in a tracking error detecting circuit which is used in an 8 mm video tape recorder, four low frequency pilot signals of different frequencies are set and the low frequency pilot signals are frequency multiplexed one by one to a video signal and recorded every video track.

Upon reproduction, two low frequency pilot signals recorded on both of the adjacent video tracks are detected as a crosstalk from the adjacent video tracks and reproduction output levels of two low frequency pilot signals are compared, thereby detecting a tracking error (for instance, Akira Hirota, "WITH RESPECT TO THE 8 mm VIDEO TAPE RECORDER (1)" Technical Report of Japan Society of Television, VR61-1, Published on Feb. 23, 1984).

FIG. 16 is a block diagram showing a construction of a tracking error detecting circuit which is used in the conventional 8 mm video tape recorder (VTR).

In FIG. 16, a signal recorded on a magnetic recording medium 501 is reproduced by a magnetic head 502 and an amplifying circuit 503. The reproduced signal includes pilot signals from both of the adjacent tracks. A 4-frequency generating circuit 504 generates a signal having the same time base and frequency as those of the pilot signal of the reproduction track by using a clock generated from a color APC (Auto Phase Control) of the 8 mm VTR and a PG (rotating position detection pulse) of the 8 mm VTR. The signal from the generating circuit 504 is multiplied with the pilot signals from both of the adjacent tracks by multiplying circuits 505 and 506.

The signals generated from the multiplying circuits 505 and 506, therefore, include a signal having the same frequency as that of a horizontal sync signal and a signal having a frequency which is three times as high as the frequency of the horizontal sync signal due to the pilot signals from both of the adjacent tracks in which time base fluctuation errors have been corrected.

A signal having the same frequency as that of the horizontal sync signal and a signal having the frequency which is three times as high as the horizontal sync frequency are extracted by band pass filters (hereinafter, abbreviated to BPFs) 507 and 508.

Detecting circuits 509 and 510 execute the square detection or full wave detection and detect amplitude values of the signals generated from the BPFs 507 and 508, respectively. Unnecessary components are eliminated by low pass filters (hereinafter, abbreviated to LPFs) 511 and 512. A difference between outputs of the LPFs 511 and 512 is obtained by a subtracting circuit 513, thereby detecting a tracking error signal.

However, hitherto, in the case where the tracking error detecting circuit is further made correspond to a format which needs to realize a narrow track or the like, it is necessary to further set the band of the BPF to a narrow band in order to improve the detecting accuracy of the tracking error.

Even when a tank circuit of a narrow band (high Q) is used for the BPF, however, a range of up to Q=20 can be realized and it is difficult to realize a hardware which provides a value of Q higher than such a value.

Even in the case where a digital signal is used as a main signal and recorded together with the pilot signals for tracking or the like, since the digital signal has a signal component until the low frequency band, a recording/reproduction C/N ratio of the pilot signal deteriorates. To compensate the deteriorated amount, the band of the BPF also similarly needs to be made narrow and a problem similar to that mentioned above occurs.

SUMMARY OF THE INVENTION

In consideration of the above points, it is an object of the invention to provide a tracking error detecting circuit of a magnetic recording and reproducing apparatus in which a detecting accuracy of a tracking error which becomes a problem in the case of performing a narrow track pitch or the case of using a digital signal as a main signal can be accomplished irrespective of a band of a BPF and its hardware can be easily realized.

According to an embodiment of the invention, amplitudes of two pilot signals as both of adjacent crosstalk signals reproduced together with a main signal from a magnetic recording medium through a magnetic head are detected by the following construction.

That is, 2N signals in which frequencies are the same as those of two pilot signals and phases are different by N phases are generated from a reference signal generating circuit.

2N signals and the pilot signals reproduced as adjacent crosstalks are multiplied by 2N multiplications. Unnecessary components are eliminated from 2N multiplication outputs by 2N LPFs and the resultant signals are generated.

The reason why one pilot signal is multiplied with N signals of N different phases is because since the phases of the pilot signals which are reproduced as adjacent crosstalks are undefined, in order to accurately detect the amplitude information from the pilot signals of the undefined phase, the amplitude information is separated into N vectors by the signals of N phases and detected.

Therefore, with respect to one pilot signal, by vector synthesizing N outputs from the LPFs by a single vector synthesis, the accurate amplitudes of the pilot signals are detected irrespective of the phases thereof.

The tracking error detecting accuracy is determined by the band of the LPF after completion of the multiplication because the tracking error is detected in accordance with the sync detecting system. The detecting S/N ratio, therefore, can be easily improved by narrowing the band of the LPF and its hardware can be easily realized.

Particularly, in the case of using the digital signal as a main signal, so long as the reference signal generating circuit is constructed by a PLL for generating a reproduction clock, a reproduction processing circuit can be commonly used. Further, the tracking error can be detected while correcting also time base fluctuations of the pilot signals and it is extremely effective.

DESCRIPTION OF THE PREFERRED EMBODIMENTS

Embodiments of the present invention will be described hereinbelow with reference to the drawings.

Figure 1:
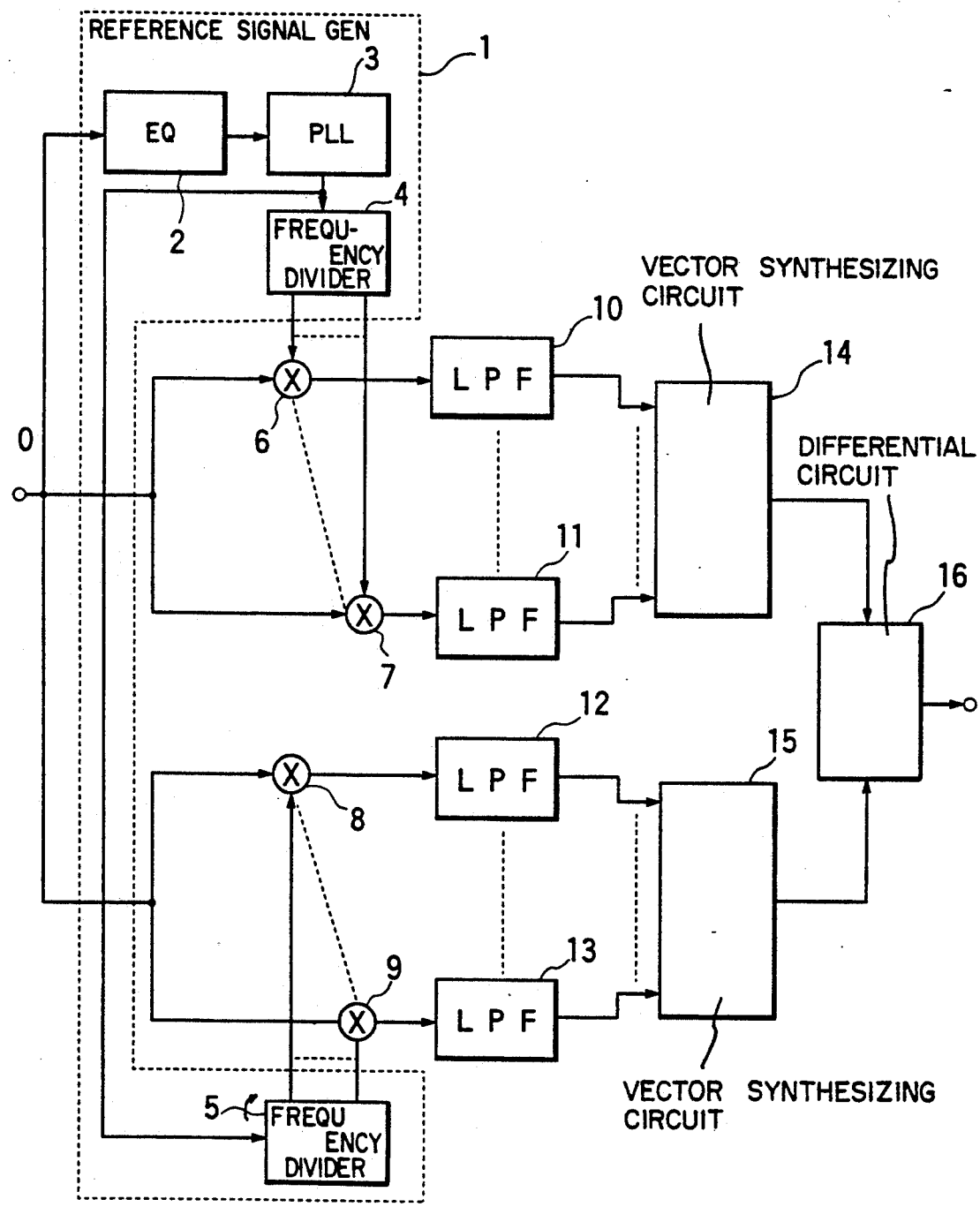
FIG. 1 shows a block diagram of a main section of a tracking error detecting circuit in the first embodiment of the invention.

FIG. 1 shows a block diagram of a main section of a tracking error detecting circuit of a magnetic recording and reproducing apparatus in the first embodiment of the invention.

Figure 2:
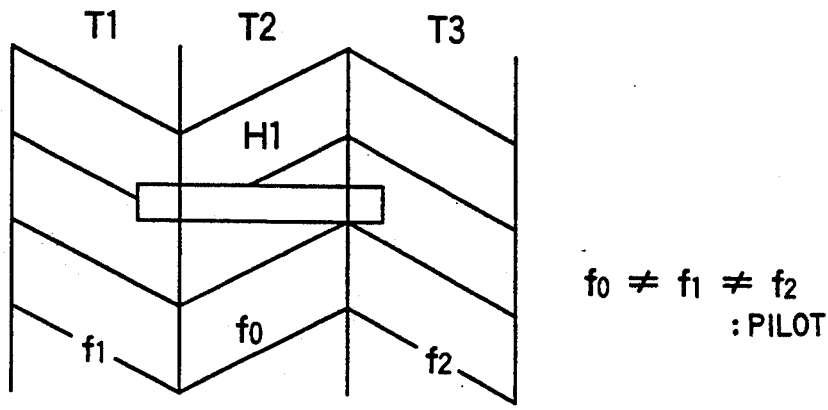
FIG. 2 is a diagram showing a tape format when tracking pilot signals are added to a digital signal of a main signal and recorded.

A signal shown in FIG. 2 is reproduced by a magnetic head $H_1$ and supplied to a terminal 0.

That is, a digital signal as a main signal and tracking pilot signals $f_1$ and $f_2$ are respectively added and recorded to tracks $T_1$ and $T_3$ formed on a magnetic tape. Frequencies of the pilot signals $f_1$ and $f_2$ are set to values which are fractions of integer of a clock frequency of the main digital signal.

A digital signal as a main signal and a tracking pilot signal $f_0$ are recorded on a track $T_2$ ($f_0 \neq f_1 \neq f_2$).

Now, assuming that the magnetic head $H_1$ is located over the track $T_2$, the digital signal including the tracking pilot signals $f_1$ and $f_2$ which are reproduced as adjacent crosstalks is reproduced.

Returning to FIG. 1, the reproduction signal from the magnetic head $H_1$ is amplified and supplied to the terminal 0.

A reference signal generating circuit 1 generates N signals in which frequencies are the same as those of the tracking pilot signals $f_1$ and $f_2$ and phases differ every pilot signals $f_1$ and $f_2$.

As shown in FIG. 2, in the case where the main signal is the digital signal and the frequency of the tracking pilot signals is set to values which are fractions of integers of the clock frequency, the reference signal generating circuit 1 comprises an equalizer (EQ) 2, a PLL circuit 3, and frequency dividers 4 and 5. The EQ circuit 2 is fundamentally constructed by a cosine equalizer circuit and corrects a frequency deterioration of the reproduction digital signal. The PLL circuit 3 is fundamentally constructed by a phase comparator, an LPF, and a voltage controlled oscillator and generates a clock of the digital signal from the edge of the digital signal as an output of the EQ 2.

The frequency dividers 4 and 5 are fundamentally constructed by counter circuits and respectively generate N signals in which frequencies are the same as those of the pilot signals $f_1$ and $f_2$ and phases differ.

N multipliers 6 and 7 multiply the signal supplied to the terminal 0 and the N signals which are generated from the reference signal generating circuit 1 and in which the frequencies are the same as that of the pilot signal $f_1$ and the phases are different.

Similarly, N multipliers 8 and 9 multiply the signal supplied to the terminal 0 and N signals in which the frequencies are the same as that of the pilot signal $f_2$ generated from the reference signal generating circuit 1 and the phases are different.

The reason why the N signals having different phases are multiplied as mentioned above is because since the phases of the pilot signals $f_1$ and $f_2$ which are supplied to the terminal 0 and reproduced as adjacent crosstalks cannot be decided, the accurate amplitude value cannot be detected.

Therefore, the signal supplied to the terminal 0 is multiplied with the signals in which the frequencies are the same as that of the pilot signal and phases are set to different N phases and is vector separated and the accurate amplitude value of the pilot signal is detected as a vector separation component.

In N LPFs 10 to 11 and N LPFs 12 to 13, unnecessary components are eliminated and N vector separated components are detected every pilot signals $f_1$ and $f_2$.

The amplitude components are vector synthesized by vector synthesizing circuits 14 and 15 every pilot signals $f_1$ and $f_2$ and are detected and supplied to a differential circuit 16.

The differential circuit 16 compares the detected amplitude values of the pilot signals $f_1$ and $f_2$ and detects as a tracking error signal.

As mentioned above, since the amplitude values are detected by the synchronous detections by the multipliers 6 to 7 and multipliers 8 to 9, a detecting S/N ratio is determined by the LPFs 10 to 11 and LPFs 12 to 13.

As in the conventional example, therefore, the detecting S/N ratio is not decided by the band of the BPF but is determined by the band of the LPF. The low band of the LPF, thus, can be realized by a simple circuit construction and it becomes extremely effective realizing means.

Although the phases of the pilot signals $f_1$ and $f_2$ which are reproduced as adjacent crosstalks cannot be unconditionally determined by a head attaching error or the like, since the amplitude values are vector separated and the amplitude components are detected, the amplitude values can be detected irrespective of the phase. Thus, an error due to the undefined phase doesn't occur.

Figure 3:
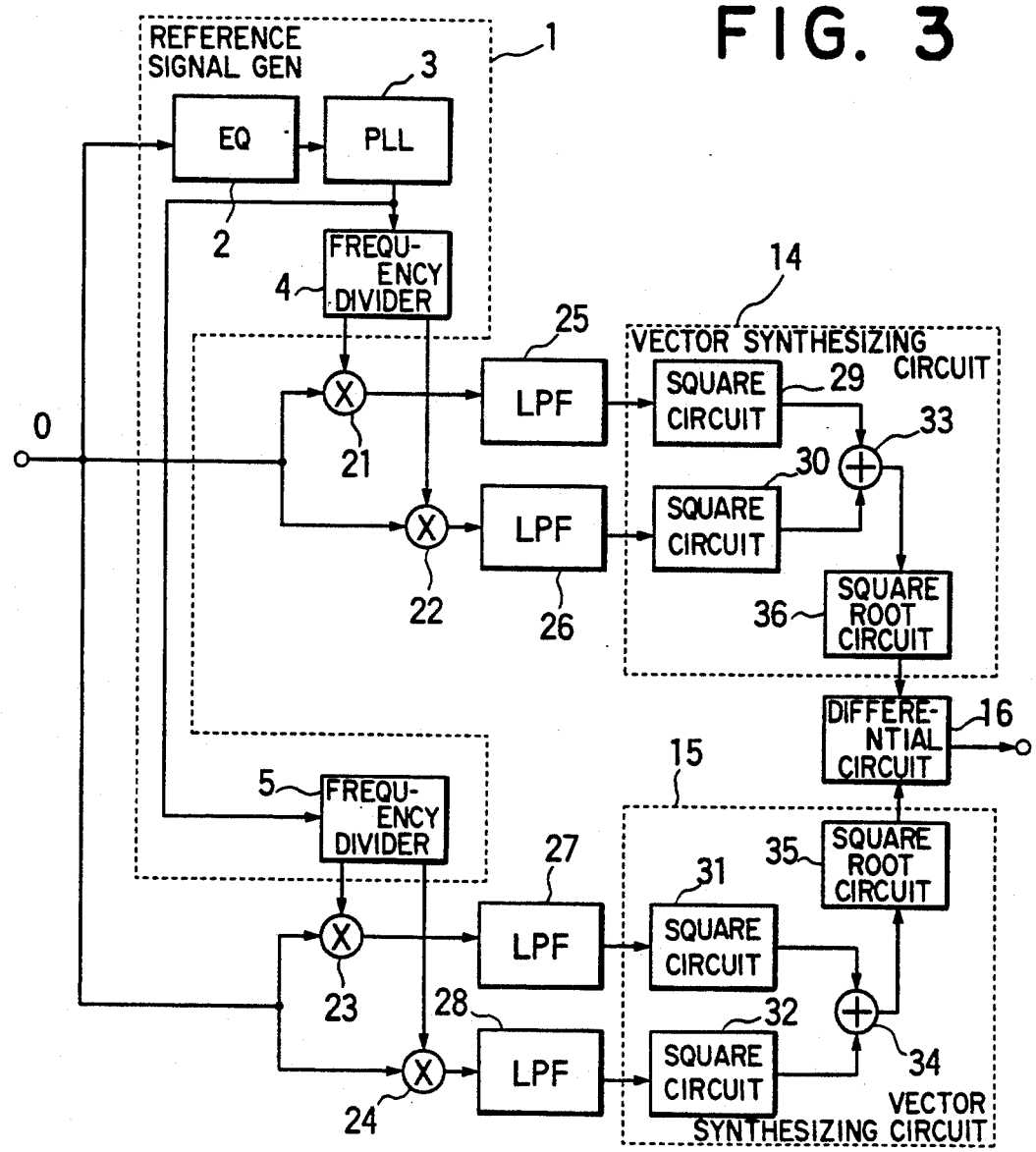
FIG. 3 is a diagram showing a block of a main section of a tracking error detecting circuit in the second embodiment of the invention.

A block of a main section in the second embodiment of the invention is shown in FIG. 3 and will now be explained with reference to FIG. 3.

In FIG. 3, the same component elements as those shown in the first embodiment are designated by the same reference numerals. The reproduction digital signal including the tracking pilot signals $f_1$ and $f_2$ reproduced as adjacent crosstalks is supplied to the terminal 0 in a manner similar to the first embodiment.

Multipliers 21 and 22 multiply the signal supplied from the terminal 0 and the signals (SIN wave and COS wave) having the same frequency as that of the pilot signal $f_1$ and whose phases differ by 90° which have been generated from the reference signal generating circuit 1 and transmit to LPFs 25 and 26.

The LPFs 25 and 26 eliminate the unnecessary components and generate components which are vector separated into an SIN wave axis and a COS wave axis and indicate the amplitude value of the pilot signal $f_1$.

Similarly, in multipliers 23 and 24 and LPFs 27 and 28, components which are vector separated into the SIN wave axis and COS wave axis of the pilot signal $f_2$ and indicate the amplitude value of the pilot signal $f_2$ and generated.

The vector synthesizing circuit 14 comprises square circuits 29 and 30, an adder 33, and a square root circuit 36 and synthesizes the vector components which are supplied from the LPFs 25 and 26 and indicate the amplitude value of the pilot signal $f_1$ and detects the amplitude value of the pilot signal $f_1$.

That is, as for the components separated into the SIN wave axis and COS wave axis, assuming that the amplitude value of the pilot signal $f_1$ is set to A and that there is a phase deviation of $\theta$ from the SIN wave axis, the components which are generated from the LPFs 25 and 26 are obtained by $(A * SIN\theta)$ and $(A * COS\theta)$. (The amplitude value of the signal which is generated from the reference signal generating circuit 1 assumes 1.)

The square circuits 29 and 30 respectively square $(A * SIN\theta)$ and $(A * COS\theta)$. The adder 33 adds both of the output signals of the square circuits 29 and 30, so that $A^2 * (SIN^2\theta + COS^2\theta)$ is obtained. That is, the amplitude value of the pilot signal $f_1$ is derived irrespective of the phase $\theta$.

The square root circuit 36 calculates a square root of the output of the adder 3 and generates the amplitude value (A in the example) of the pilot signal $f_1$.

Therefore, in the above vector synthesizing circuit 14, the accurate amplitude value of the pilot signal $f_1$ can be detected irrespective of the phase of the pilot signal $f_1$ supplied from the terminal 0.

The vector separated components of the pilot signal $f_2$, that is, outputs of the LPFs 27 and 28 are also synthesized by the vector synthesizing circuit 15 comprising square circuits 31 and 32, an adder 34, and a square root circuit 35 in a manner similar to the above. The amplitude value of the pilot signal $f_2$ is detected and supplied to the differential circuit 16.

Lastly, the difference circuit 16 compares the amplitude values of two detected pilot signals and detects and generates a tracking error signal in a manner similar to the first embodiment.

Therefore, in a manner similar to the first embodiment, the detecting S/N ratio is decided by the band of the LPF. The detecting S/N ratio can be improved by narrowing the band of the LPF and the above construction becomes extremely effective realizing means.

Although the phases of the pilot signals $f_1$ and $f_2$ which are reproduced as adjacent crosstalks cannot be determined, since the amplitude components are detected by vector separating, the amplitude value can be detected irrespective of the phase and it is extremely effective.

In case the circuit in FIG. 3 is realized by a digital circuit in which the BPF and an analog-digital converter are inserted between the terminal 0 and the multipliers, the digital circuit is simplified by being set to frequency relation between the frequency of the pilot signal and the clock frequency in the analog-digital converter as below.

That is, the frequency relation between the pilot signals $f_1$ and $f_2$ are set to "$f_2 = 1.5 * f_1$", and the clock frequency (f clk) are set to "f clk = $6 * f_1$".

Therefore, the digital circuit is simplified because output of frequency dividers 4 and 5 become a constant ($\pm 1$, $\pm \sqrt{3}/2$, $\pm \frac{1}{2}$, 0) by being set to as mentioned above.

Figure 4:
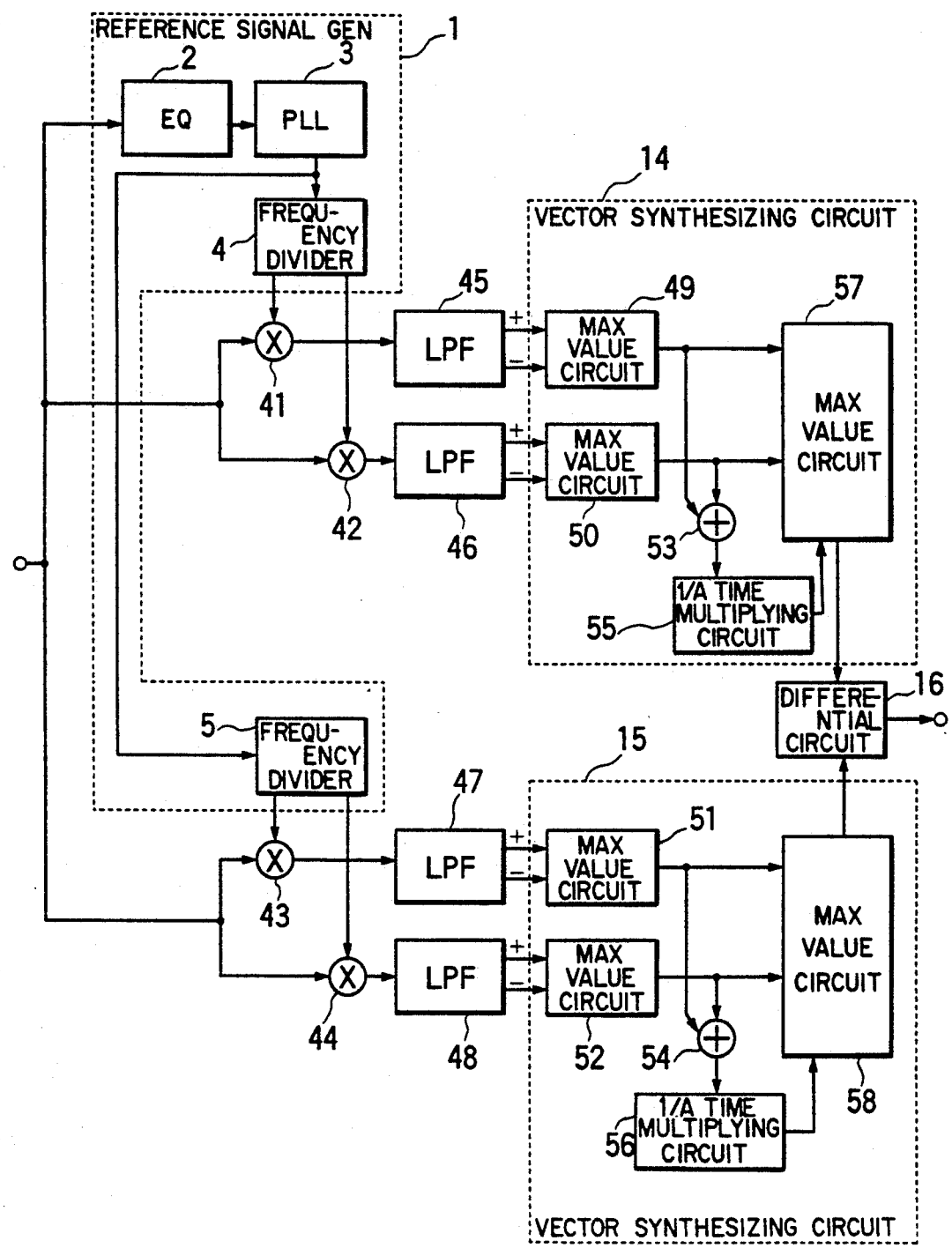
FIG. 4 is a diagram showing a block of a main section of a tracking error detecting circuit in the third embodiment of the invention.

A block of a main section in the third embodiment of the invention is shown in FIG. 4 and will now be described with reference to the drawings.

In FIG. 4, the same component elements as those shown in the first embodiment are designated by the same reference numerals.

The third embodiment differs from the second embodiment with respect to a point that the vector synthesis is approximately performed so as to simplify a construction of the vector synthesizing circuit.

The reproduction digital signal including the tracking pilot signals $f_1$ and $f_2$ reproduced as adjacent crosstalks is supplied to the terminal 0 in a manner similar to the first embodiment.

In a manner similar to the second embodiment, the reference signal generating circuit 1 is constructed by the EQ 2, PLL 3, and frequency dividers 4 and 5 and respectively generates two signals having the same frequencies as those of the pilot signals $f_1$ and $f_2$ and whose phases are different by 90°.

Multipliers 41, 42, 43, and 44 multiply the signal generated from the reference signal generating circuit 1 and the signal supplied from the terminal 0 in a manner similar to the second embodiment. The amplitude value components of the vector separated pilot signals are detected by LPFs 45, 46, 47, and 48.

Two non-inverting waveform and inverting waveform are generated as outputs of each of the LPFs 45 to 48.

The vector synthesizing circuit 14 comprises maximum value circuits 49 and 50, an adder 53, a 1/A time multiplying circuit 55, and a maximum value circuit 57.

The operation of the vector synthesizing circuit 14 will now be described with reference to a principle waveform diagram shown in FIG. 5.

That is, the maximum value circuit 49 compares amplitude values of the non-inverting waveform and inverting waveform generated from the LPF 45 and selects either larger one of them and generates.

Figure 5:
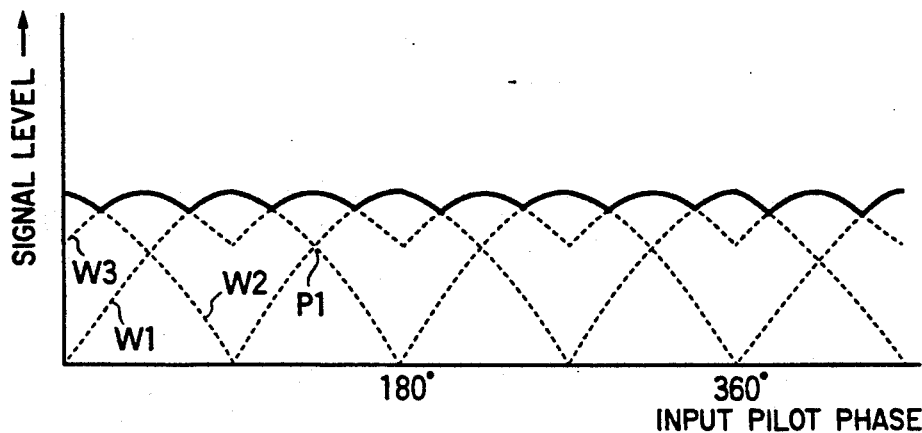
FIG. 5 is a principle waveform diagram showing the principle of the third embodiment of the invention.

A signal which is generated from the maximum value circuit 49, therefore, has a waveform $W_1$ in FIG. 5 for the phase of the input pilot signal.

Similarly, a maximum value circuit 50 compares amplitude values of the non-inverting waveform and inverting waveform generated from the LPF 46 and selects either larger one of them and generates, so that a waveform $W_2$ shown in FIG. 5 is derived.

The adder 53 adds the outputs of the maximum value circuits 49 and 50. The 1/A time multiplying circuit 55 multiplies 1/A to an output of the adder 53 so as to obtain the amplitude value which is equal to the amplitude values of the outputs of the maximum value circuits 49 and 50. That is, in this case, the circuit 55 multiplies $1/\sqrt{2}$ to the output of the adder 53 and generates the resultant signal.

The signal generated from the 1/A time multiplying circuit 55, therefore, has a waveform $W_3$ shown in FIG. 5.

The maximum value circuit 57 compares outputs of the maximum value circuits 49 and 50 and 1/A time multiplying circuit 55 and selects the maximum value among them, so that a waveform shown by a solid line in FIG. 5 is derived.

Therefore, FIG. 5 shows a state in which a phase of the input pilot signal is changed on the assumption that the amplitude value of the tracking pilot signal is constant, so that the signal approximately includes an error of a certain extent. However, since an approximate error is small, the tracking error detecting accuracy is hardly influenced. The pilot amplitude values can be vector synthesized and detected irrespective of the phase of the input pilot signal.

The vector synthesizing circuit 15 is also constructed by maximum value circuits 51 and 52, an adder 54, a 1/A time multiplying circuit 56, and a maximum value circuit 58 and executes the same operation as that of the vector synthesizing circuit 14 and vector synthesizes the amplitude values of the tracking pilot signals and generates.

The differential circuit 16 calculates a difference between the amplitude values of the two tracking pilot signals generated from the vector synthesizing circuits 14 and 15 and detects a tracking error signal and generates.

Therefore, in a manner similar to the first and second embodiments, the detecting S/N ratio is decided by the band of the LPF and can be improved by narrowing the band of the LPF. The above construction becomes extremely effective means.

Since the square circuit and the square root circuit are unnecessary as compared with the second embodiment, the embodiment can be realized by a simple circuit construction and it becomes extremely effective realizing means.

FIGS. 6A to 6E show modifications of the third embodiment. Even when the vector synthesizing circuit 14 and the vector synthesizing circuit 15 having the same construction as that of the vector synthesizing circuit 14 can be realized by constructions shown in FIG. 6, the same effect can be obtained.

That is, in Fig. A, absolute value circuits 65 and 66 are used in place of the maximum value circuits 49 and 50 and the maximum value circuits 51 and 52 in FIG. 4. By using the absolute value of either one of the outputs of the non-inverting waveform and inverting waveform from LPFs 63 and 64, the same waveforms as those of the maximum value circuits 49 and 50 and the maximum value circuits 51 and 52 can be generated.

Figure 6A:
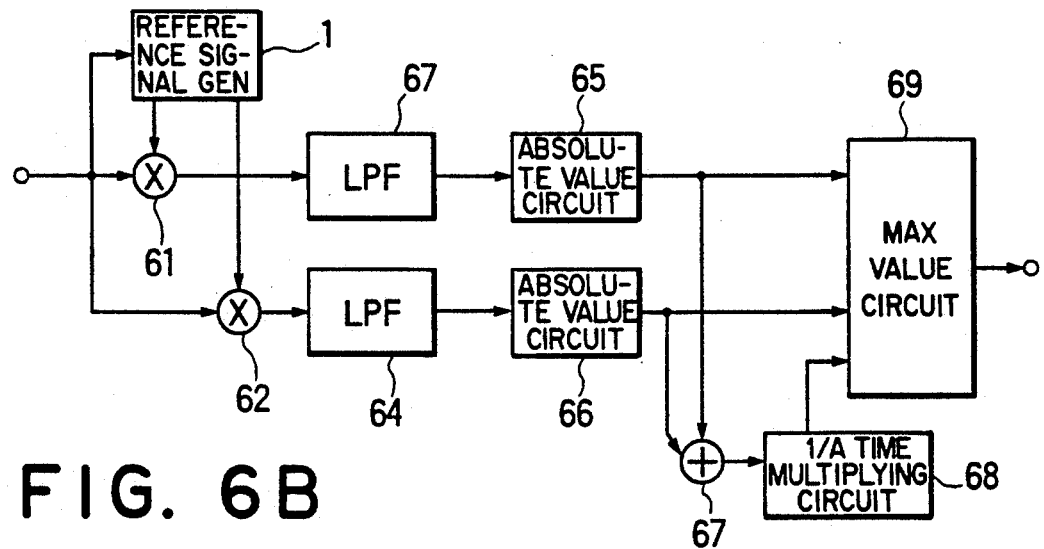
FIGS. 6A to 6E are diagrams showing blocks of main sections of tracking error detecting circuits in the applications of the third embodiment of the invention.
Figure 6B:
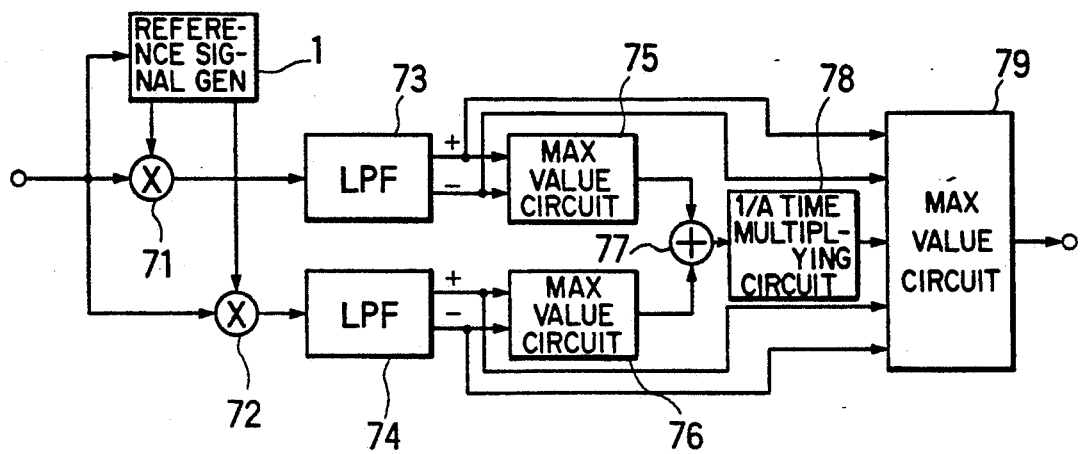

As shown in FIG. 6B even when non-inverting waveforms and inverting waveforms of LPFs 73 and 74 and an output of a 1/A time multiplying circuit 78 are compared as signals which are supplied to a maximum value circuit 79 and the maximum value is obtained, outputs similar to those of the maximum value circuits 57 and 58 shown in FIG. 4 can be obtained.

Figure 6C:
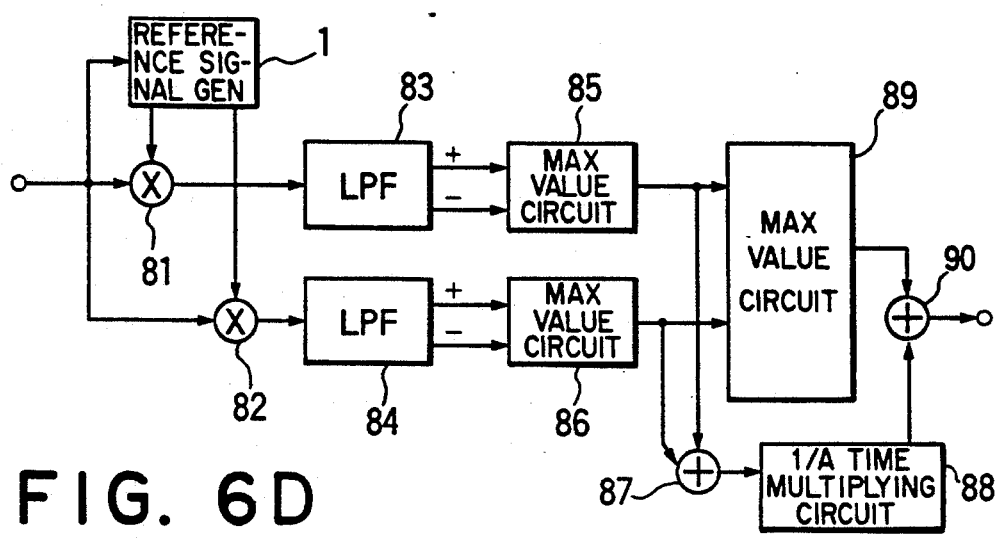

According to a construction of FIG. 6C, non-inverting waveforms and inverting waveforms of LPFs 83 and 84 are respectively compared by maximum value circuits 85 and 86 and the maximum values are generated.

An adder 87 adds the outputs of the maximum value circuits 85 and 86. An output of the adder 87 is multiplied with 1/A time by a 1/A time multiplying circuit 88, thereby obtaining amplitude values similar to those of the outputs of the maximum value circuits 85 and 86. A maximum value circuit 89 compares the outputs of the maximum value circuits 85 and 86 and selects the maximum value and generates.

When an output of the 1/A time multiplying circuit 88 and an output of the maximum value circuit 89 are added by an adder 90 and an addition signal is generated, the vector synthesis can be also performed in a manner similar to FIG. 4 although the output amplitude value level changes.

Figure 6D:
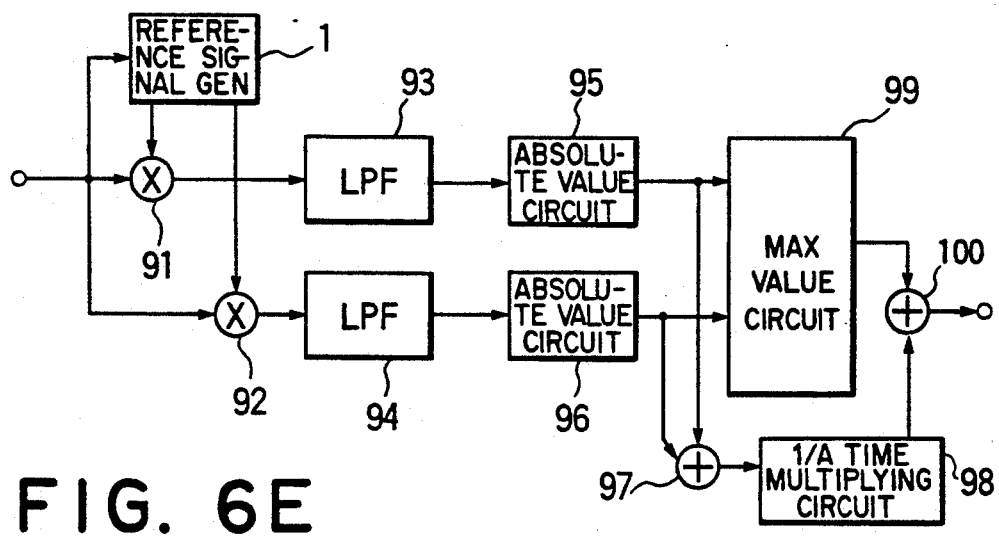

FIG. 6D shows a construction in which absolute value circuits 95 and 96 are used in place of the maximum value circuits 85 and 86 shown in FIG. 6C. In a manner similar to FIG. 6A, even by obtaining the absolute value of either one of the non-inverting waveform and the inverting waveform of each of LPFs 93 and 94, the same signals as those of the waveforms which are generated from the maximum value circuits 85 and 86 can be generated.

Figure 6E:
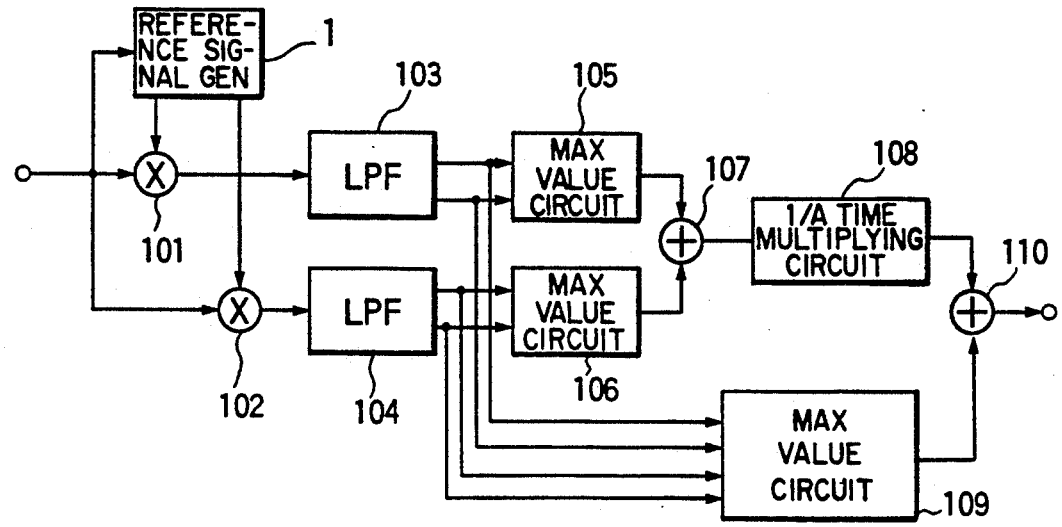

Lastly, in FIG. 6E, the non-inverting wave-forms and inverting waveforms of the LPFs 103 and 104 are respectively compared by the maximum value circuits 105 and 106 and the maximum values are generated therefrom.

Outputs of maximum value circuits 105 and 106 are added by an adder 107, an output of the adder 107 is multiplied with 1/A time by a 1/A time multiplying circuit 108, and the amplitude value levels are matched and generated in a manner similar to the third embodiment of FIG. 4.

A maximum value circuit 109 compares four signals of non-inverting waveforms and inverting waveforms of the LPFs 103 and 104 and selects the signal indicative of the maximum value and generates.

When an output of the 1/A time multiplying circuit 108 and an output of the maximum value circuit 109 are added by an adder 110 and an output is generated therefrom, the vector synthesis can be also performed in a manner similar to FIG. 4 although the output amplitude value level changes. The amplitude values of the tracking pilot signals can be detected. Therefore, FIGS. 6A to 6E relate to the modifications of the third embodiment. The construction of the vector synthesizing circuit 14 and the construction of the vector synthesizing circuit 15 having the same construction as the vector synthesizing circuit 14 can be replaced by the constructions shown in FIGS. 6A to 6E and the same effect as that in the third embodiment can be obtained.

Figure 7:
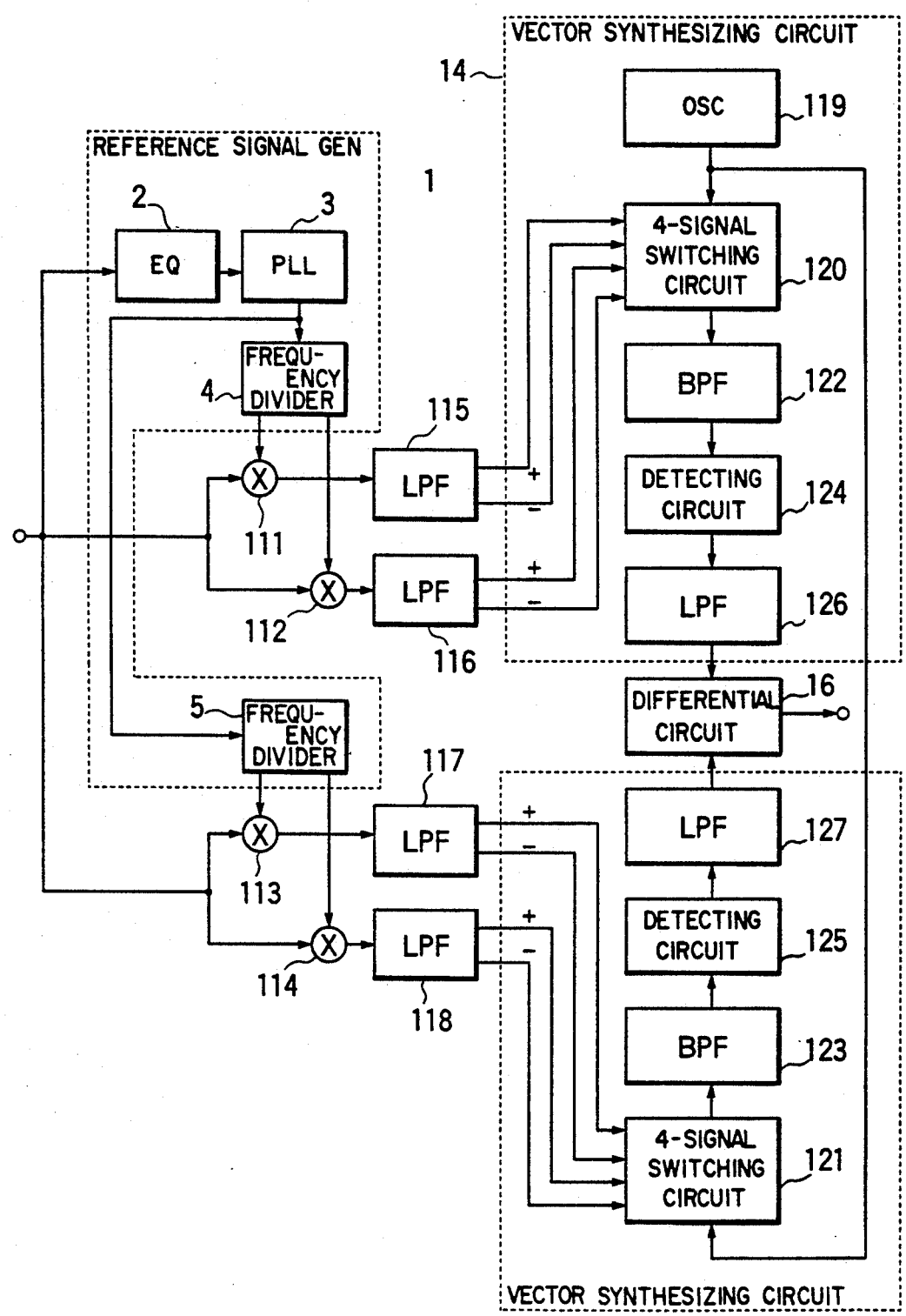
FIG. 7 is a diagram showing a block of a main section of a tracking error detecting circuit in the fourth embodiment of the invention.

A block of a main section in the fourth embodiment of the invention is shown in FIG. 7 and will now be described with reference to the drawing.

In FIG. 7, the same component elements as those shown in the first embodiment are designated by the same reference numerals The fourth embodiment differs from the second embodiment with respect to a point that the construction of the vector synthesis is replaced by a construction using conventional detecting circuits The reproduction digital signal including the tracking pilot signals $f_1$ and $f_2$ reproduced as adjacent crosstalks is supplied to the terminal 0 in a manner similar to the first embodiment.

The reference signal generating circuit 1 is constructed by the EQ 2, PLL 3, and frequency dividers 4 and 5 in a manner similar to the second embodiment and respectively generates two signals having the same frequencies as those of the pilot signals $f_1$ and $f_2$ and whose phases are different by 90°.

Multipliers 111, 112, 113, and 114 execute multiplications of the signals generated from the reference signal generating circuit 1 and the signal supplied from the terminal 0 in a manner similar to the second embodiment. Amplitude value components of the vector separated pilot signals are detected by LPFs 115, 116, 117, and 118.

Two non-inverting waveform and inverting waveform are generated as outputs of each of the LPFs 115 to 118.

That is, the amplitude components which are generated from the LPFs 115 and 116 (or LPFs 117 and 118) are the components which have been separated into the SIN wave axis and COS wave axis because there is a phase difference of 90° between the signals generated from the reference signal generating circuit 1. The generation of the non-inverting waveform and inverting waveform denotes that the components of the $-$SIN wave axis and $-$COS wave axis are further generated.

Therefore, when it is now assumed that the amplitude value (PP value) of the pilot signal is set to 2A and the amplitude value (pp value) of the signal generated from the reference signal generating circuit is set to 2 and there is a phase difference of $\theta$ between the signal generated from the reference signal generating circuit 1 and the pilot signal, the outputs of the LPFs 115 and 116 (or LPFs 117 and 118) can be expressed by $A\text{SIN}\theta$, $A\text{COS}\theta$, $-A\text{SIN}\theta$, and $-A\text{COS}\theta$, respectively.

The vector synthesizing circuit 14 comprises an oscillating circuit 119, a 4-signal switching circuit 120, a BPF 122, a detecting circuit 124, and an LPF 126. The BPF 122, detecting circuit 124, and LPF 126 can be constructed in the same manner as those in the conventional tracking error detecting circuit.

Figure 8:
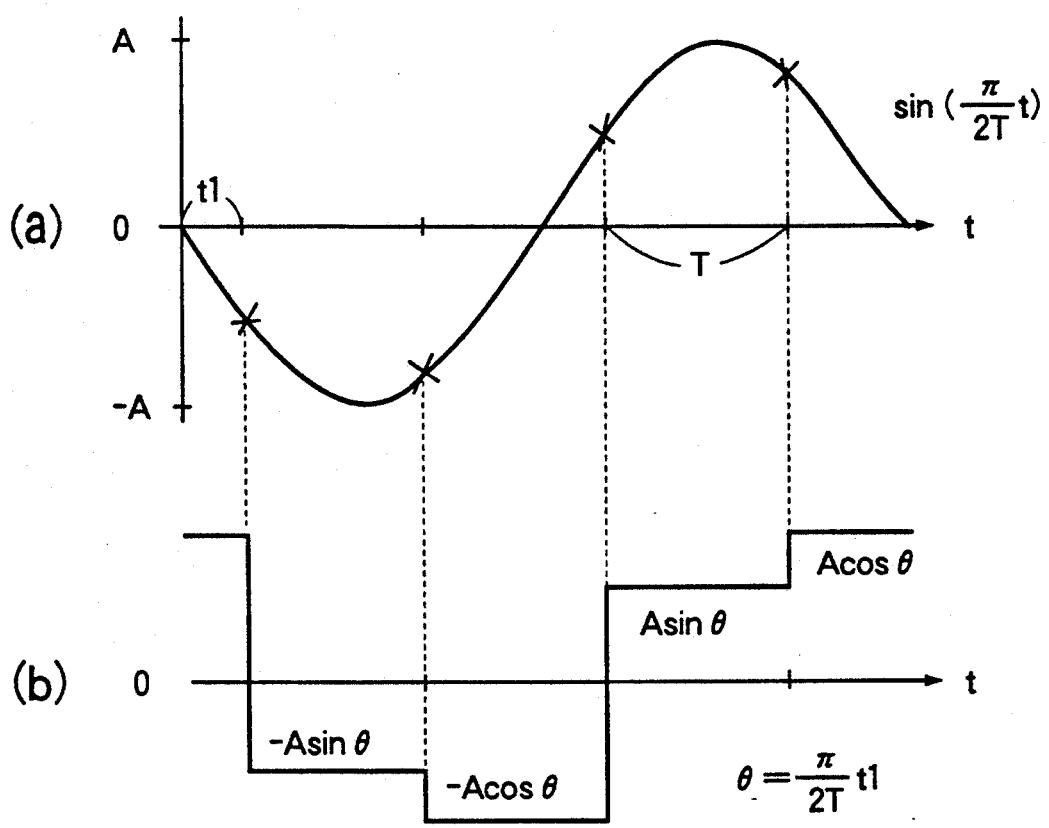
FIG. 8 is a principle waveform diagram showing the principle of the fourth embodiment of the invention.

When the signals of the LPFs 115 and 116 are switched every period T by the 4-signal switching circuit 120 in accordance with the signal of the period T generated from the oscillating circuit 119, a waveform as shown in FIG. 8(b) is derived.

Therefore, when the waveform of FIG. 8(b) is transmitted through the BPF 122 having the center frequency ($\frac{1}{4}$T), a sine wave (period 4T) of the amplitude (PP value) 2A shown in FIG. 8(a) is derived.

In this case, the waveform shown in FIG. 8(a) is such that the amplitude components of the reproduction pilot signals are vector synthesized and shown and the noise band is determined by the bands of the LPFs 115 and 116 shown in FIG. 7. Therefore, there is no need to narrow the band of the BPF 122 in order to improve the detecting S/N ratio.

Returning to FIG. 7, the signal generated from the BPF 122 is supplied to the detecting circuit 124.

Figure 16:
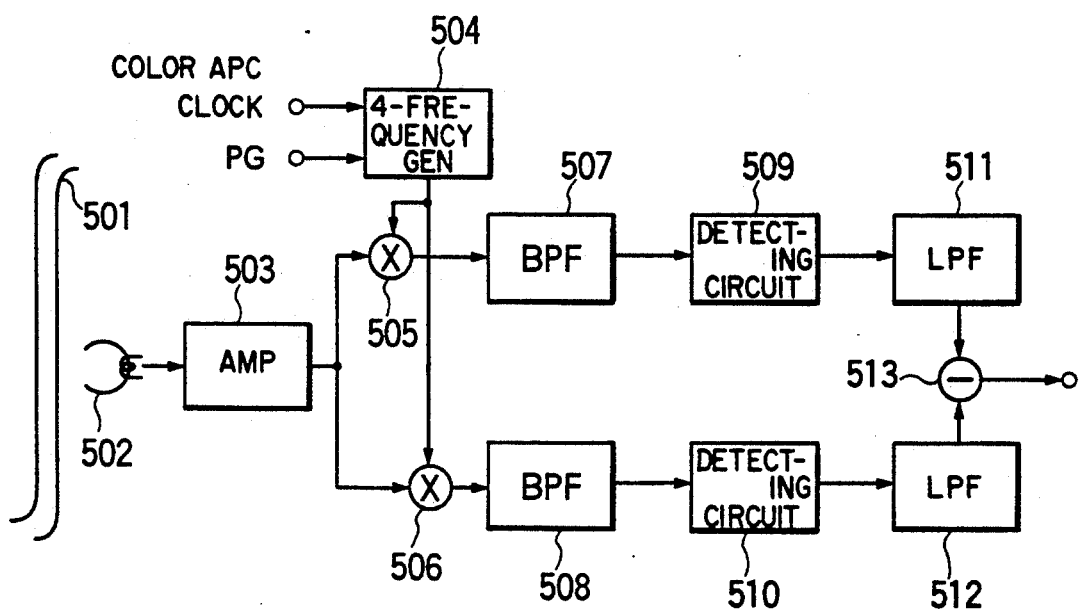
FIG. 16 is a diagram showing a block of a main section of a tracking error detecting circuit which is used in a conventional 8 mm VTR.

The detecting circuit 124 has the same construction as that of the detecting circuit 509 in FIG. 16 of the conventional example and detects an envelope. An output signal of the detecting circuit 124 is transmitted to the LPF 126, so that only the amplitude value of the reproduction pilot signal is detected.

On the other hand, the vector synthesizing circuit 15 is also constructed by a 4-signal switching circuit 121, a BPF 123, a detecting circuit 125, and an LPF 127 and vector synthesizes the amplitude values of the pilot signals and detects by the same principle as that of the vector synthesizing circuit 14.

The signal of the period T which can be used commonly to the vector synthesizing circuit 14 is realized by using the signal from the oscillating circuit 119.

The differential circuit 16 calculates a difference between the signals generated from the vector synthesizing circuits 14 and 15 and detects a tracking error and generates.

Therefore, by constructing as mentioned above, the construction in which the detecting S/N ratio can be decided by the LPF can be realized by using the conventional circuit and it is extremely effective.

As compared with the third embodiment of the invention, since the vector synthesis is not approximately performed, there are features such that no detection error occurs and the like.

Although the fourth embodiment has been described with respect to the case of using two vector axes, a similar result is derived even when the vector axes are expanded to n axes and the n signal switching is executed.

Further, in the case of increasing the number of vector axes to n, frequency differences from harmonics to be eliminated by the BPFs 122 and 123 increase and the constructions of the BPFs 122 and 123 can be simplified.

Figure 9:
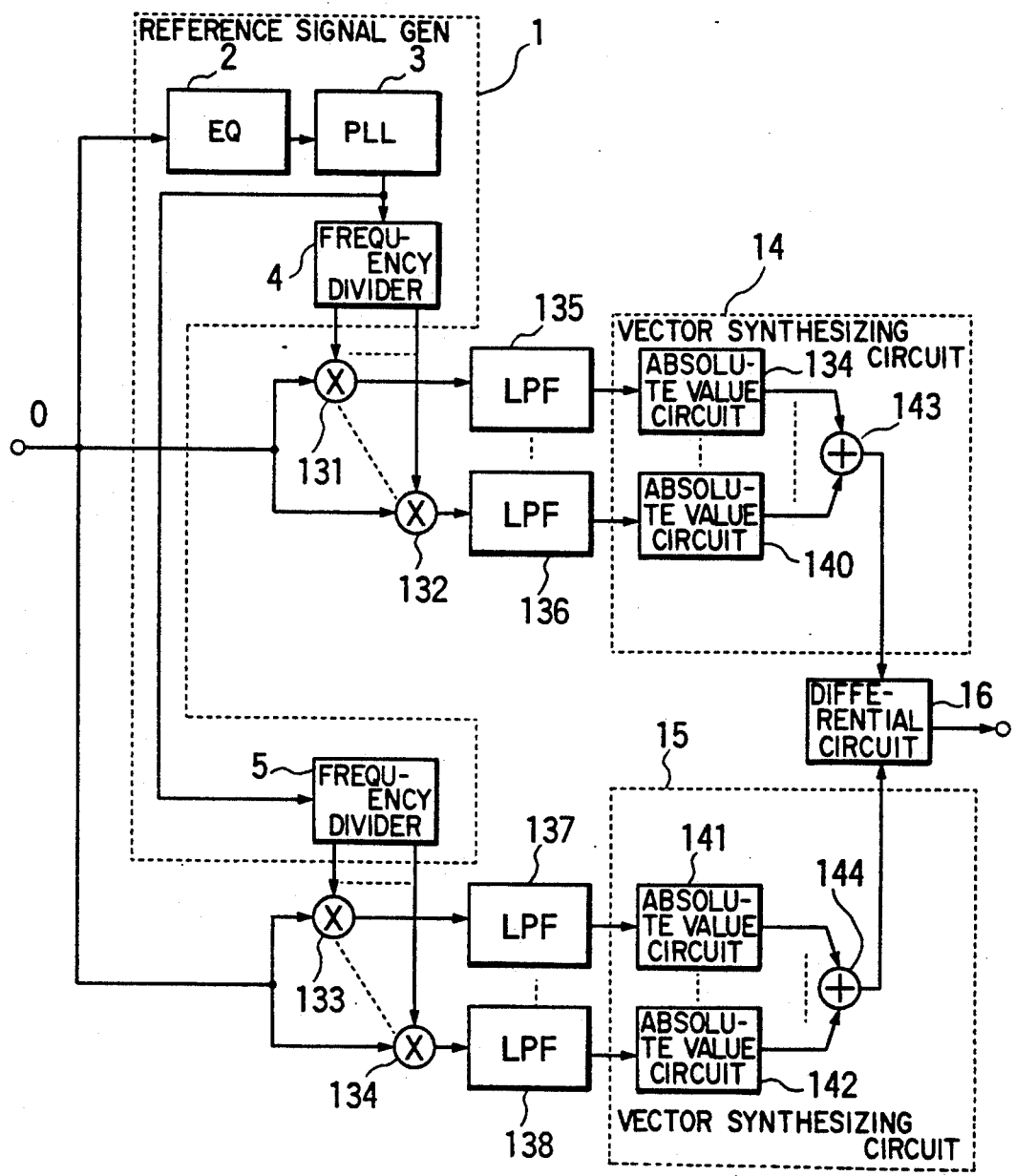
FIG. 9 is a diagram showing a block of a main section of a tracking error detecting circuit in the fifth embodiment of the invention.

A block of a main section in the fifth embodiment of the invention is shown in FIG. 9 and will be described with reference to the drawings.

In FIG. 9, the same component elements as those shown in the first embodiment are designated by the same reference numerals.

The fifth embodiment differs from the third embodiment with respect to a point that by respectively multiplying the n phase signals, the vector separation axes are increased and the approximate vector synthesizing accuracy is improved.

The reproduction digital signal including the tracking pilot signals $f_1$ and $f_2$ reproduced as adjacent crosstalks is supplied to the terminal 0 in a manner similar to the first embodiment.

The reference signal generating circuit 1 has the same construction as that of the first embodiment and comprises the EQ 2, PLL 3, and frequency dividers 4 and 5 and respectively generates n reference signals having the same frequency as that of the pilot signal and whose phases are different with respect to each of the pilot signals $f_1$ and $f_2$.

n multipliers 131 to 132 and n multipliers 133 to 134 multiply the pilot signals $f_1$ and $f_2$ generated from the reference signal generating circuit 1 with n reference signals and the number of vector separation axes is increased.

Subsequently, n LPFs 135 to 136 and n LPFs 137 to 138 detect only the amplitude components of the pilot signals which have been vector separated and supply to the vector synthesizing circuits 14 and 15, respectively.

The vector synthesizing circuit 14 comprises n absolute value circuits 139 to 140 and an adder 143.

The principle of the vector synthesizing circuit 14 will now be described by using a principle waveform diagram (in the case where n=3) of FIG. 10.

Figure 10:
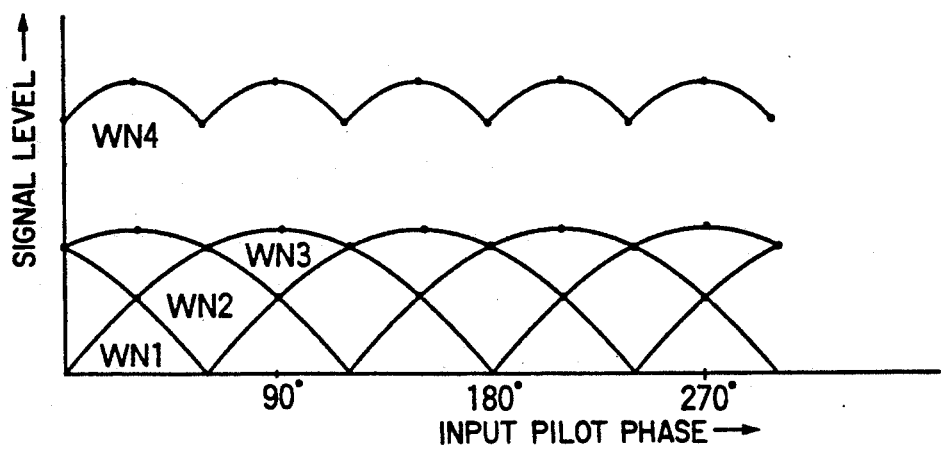
FIG. 10 is a principle waveform diagram showing the principle of the fifth embodiment of the invention.

That is, waveforms which are generated from the absolute value circuits 135 to 136 are as shown at $WN_1$, $WN_2$, and $WN_3$ in FIG. 10.

Therefore, by adding the waveforms $WN_1$, $WN_2$, and $WN_3$ by the adder 143, a waveform of $WN_4$ is obtained and is approximately vector synthesized to the value indicative of the amplitude value of the pilot signal irrespective of the phase of the input pilot signal.

On the other hand, returning to FIG. 9, the vector synthesizing circuit 15 also has the same construction as that of the vector synthesizing circuit 14 and comprises n absolute value circuits 141 to 142 and an adder 144. In a manner similar to the vector synthesizing circuit 14, the vector synthesizing circuit 15 synthesizes the amplitude value (amplitude value of the pilot signal $f_2$ so long as the vector synthesizing circuit 14 detects the amplitude value of the pilot signal $f_1$) of another pilot signal and generates.

The differential circuit 16 calculates a difference between the output signals supplied from the vector synthesizing circuits 14 and 15 and detects a tracking error and generates.

From the foregoing principle, an approximating accuracy of the vector synthesis is improved as the number of vector separation axes is increased, so that the vector synthesizing circuits 14 and 15 become extremely effective constructing means.

In a manner similar to the third embodiment, the vector synthesizing circuit can be realized by simple construction using the absolute value circuits and the adder and becomes extremely effective realizing means.

Figure 11A:
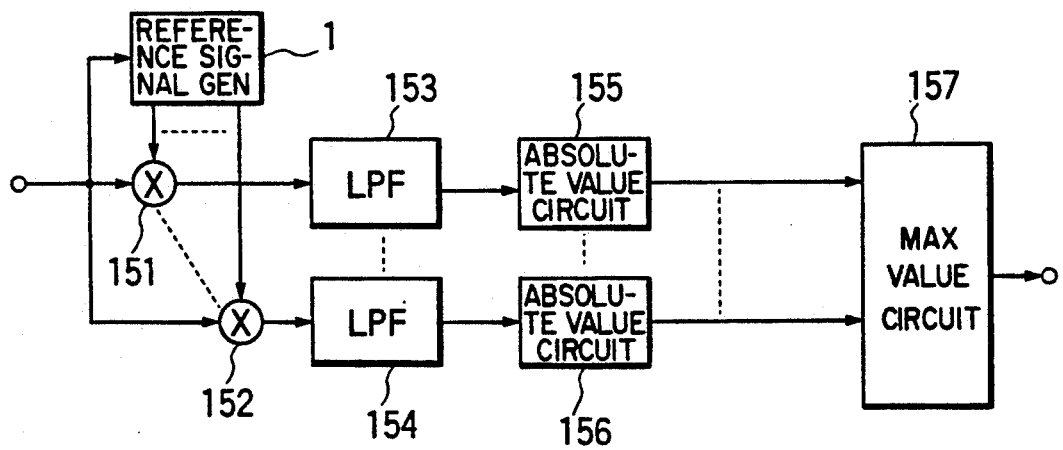
FIGS. 11A to 11C are diagrams showing blocks of main sections of tracking error detecting circuits in the applications of the fifth embodiment of the invention.
Figure 11B:
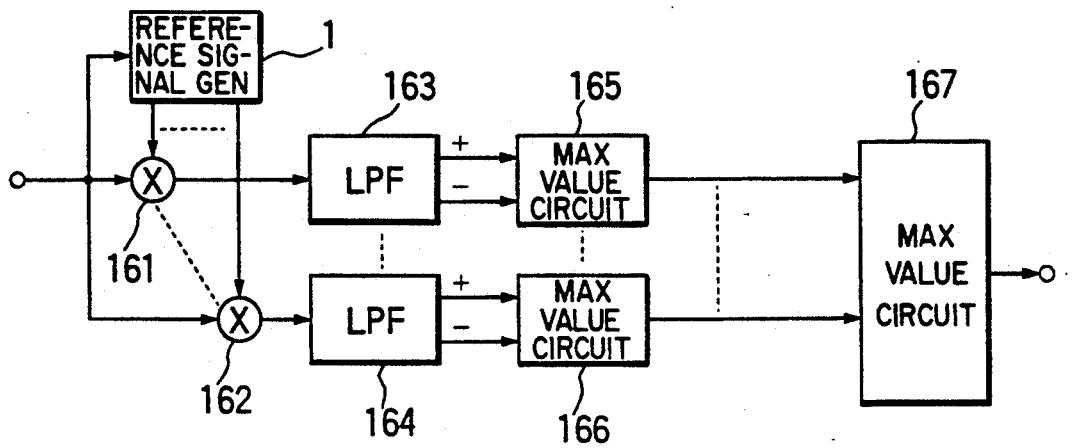
Figure 11C:
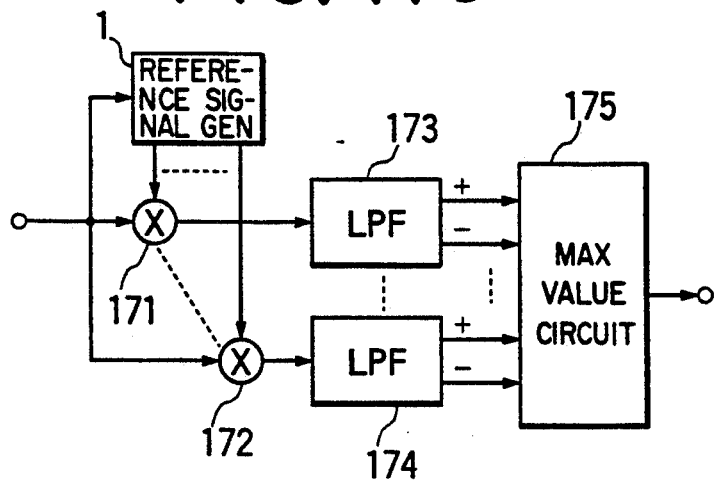

FIGS. 11A to 11C show modifications of the fifth embodiment. Even when the vector synthesizing circuit 14 and the vector synthesizing circuit 15 having the same construction as that of the vector synthesizing circuit 14 are realized by constructions shown in FIGS. 11A to 11C, the same effect as that of the fifth embodiment can be obtained.

That is, in FIG. 11A, even when the adder 143 or 144 as a component element of the vector synthesizing circuit 14 or 15 shown in FIG. 9 is replaced by a maximum value circuit 157 and the maximum value of the input signals is selected and generated, the same effect as that in FIG. 9 is derived.

In the constructions shown in FIG. 11B and 9, first of all, as compared with the output construction of the LPFs 135 to 136 or LPFs 137 to 138 shown in FIG. 9, the non-inverting waveforms and inverting waveforms are simultaneously generated in the construction of LPFs 63 to 164 in FIG. 11B.

In place of the absolute value circuits 139 to 140 or absolute value circuits 141 to 142 as component elements of the vector synthesizing circuit 14 or 15 shown in FIG. 9, maximum value circuits 165 to 166 shown in FIG. 11B are used and magnitudes of non-inverting waveforms and inverting waveforms of the LPFs 163 to 164 are respectively compared and the maximum values are selected and generated.

Therefore, by constructing as mentioned above, the output waveforms of the absolute value circuits 139 to 140 or absolute value circuits 141 to 142 shown in FIG. 9 and the output waveforms of the maximum value circuits 165 to 166 shown in FIG. 11B are substantially the same waveforms, so that a complete equivalent construction is obtained.

Further, in a manner similar to FIG. 11A, the same effect as that in FIG. 9 is obtained even when the adder 143 or 144 as a component element of the vector synthesizing circuit 14 or 15 shown in FIG. 9 is replaced by a maximum value circuit 167 shown in FIG. 11B.

As shown in FIG. 11C, even when the maximum value circuits 165, 166, and 167 shown in FIG. 11B are replaced by one maximum value circuit 175, the same effect as that in FIG. 9 is derived.

Figure 12:
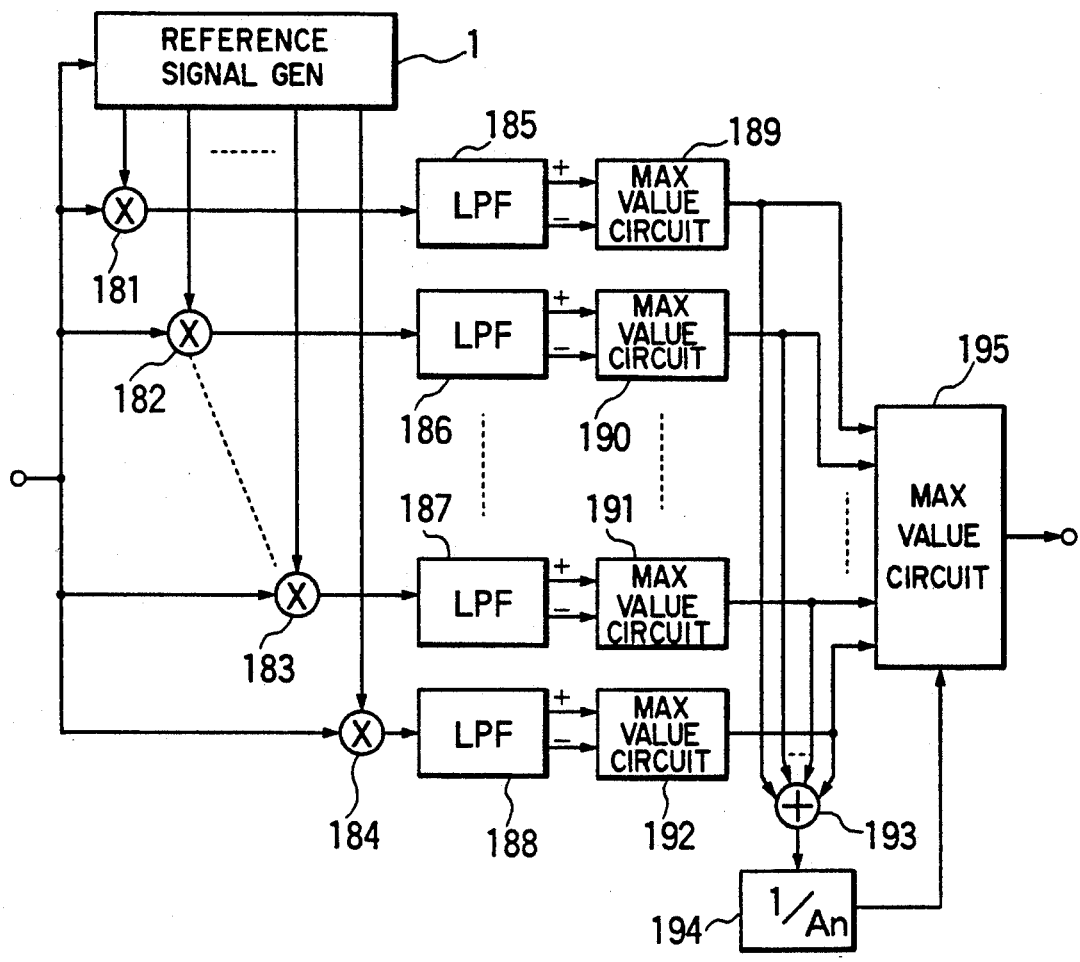
FIG. 12 is a diagram showing a block of a main section of a tracking error detecting circuit in the application of the third embodiment of the invention.

FIG. 12 shows a construction in which the number of vector separation axes in the third embodiment mentioned above is increased and the approximation of the vector synthesis is improved.

Since the vector separation and vector synthesis have the same construction with respect to the pilot signals $f_1$ and $f_2$, in the case of FIG. 12, the construction of only one of the pilot signals $f_1$ and $f_2$ is shown.

In the foregoing third embodiment, that is, in the block construction of the main section of FIG. 4, signals generated from the maximum value circuits 49 and 50 or maximum value circuits 51 and 52 are added by the adder 53 or 54 and multiplied with 1/A time by the 1/A time multiplying circuit 55 or 56 to thereby obtain the standardized amplitudes and those amplitudes are transmitted to the maximum value circuit 57 or 58.

Therefore, the waveform which is generated from the 1/A time multiplying circuit 55 or 56 is set to $W_3$ shown in FIG. 5. The $W_3$ waveform has the maximum value at a valley portion, namely, a $P_1$ point in the case where the maximum value of the waveforms which are generated from the maximum value circuits 49 and 50 or maximum value circuits 51 and 52 shown in FIG. 4, that is, the $W_1$ waveform and $W_2$ waveform shown in FIG. 5 is selected.

Therefore, by obtaining the maximum value of the waveforms of $W_1$, $W_2$, and $W_3$ shown in FIG. 5, the vector synthesis can be preferably approximated.

The waveforms of $W_1$, $W_2$, and $W_3$ in the construction of FIG. 4 mentioned above have the relations as shown at $P_1$ point in FIG. 5 in the case where the vector separation axes of the even number exist.

Therefore, FIG. 12 shows the construction in the case where the even number of vector separation axes exist.

That is, the reference signal generating circuit 1 generates 2n reference signals having the same frequency as that of the pilot signal and whose phases differ.

The amplitude components of the pilot signals supplied from the terminal 0 are vector separated by 2n multipliers 181, 182 to 183, and 184. The vector separated components are detected by 2n LPFs 185, 186 to 187, and 188.

Two kinds of non-inverting waveform and inverting waveform are generated as signals which are generated from each of the LPFs 185, 186 to 187, and 188.

The maximum values of the signals generated from the LPFs 185, 186 to 187, and 188 are selected by maximum value circuits 189, 190 to 191, and 192 and generated.

The signals generated from the maximum value circuits 189, 190 to 191, and 192 are added by an adder 193.

An output signal of the adder 193 is multiplied with $1/A_n$ time by a $1/A_n$ time multiplying circuit 194 and is standardized so as to have the amplitude values similar to those of the signals which are generated from the maximum value circuits 189, 190 to 191, and 192 and is generated.

A maximum value circuit 195 compares the outputs from the maximum value circuits 189, 190 to 191, and 192 and an output of the $1/A_n$ time multiplying circuit 194 and selects the maximum value and generates.

Therefore, as mentioned above, in FIG. 12, the signal is separated into an even number of vectors and is vector synthesized and the amplitude value of the pilot signal is detected. Therefore, as compared with the third embodiment shown in FIG. 4, an approximate error of the vector synthesis decreases, the detecting accuracy of the tracking error can be improved, and the above construction becomes extremely effective realizing means.

Figure 13A:
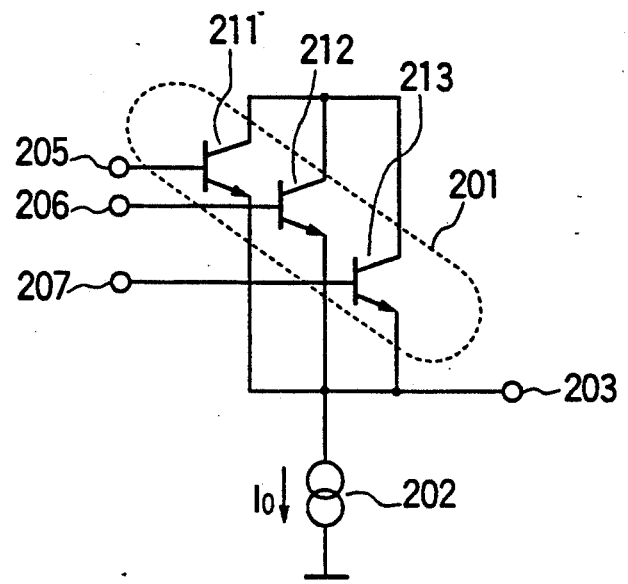
FIGS. 13A and 13B are constructional diagrams of transistor circuits which are used for the maximum value of the invention.

The maximum value circuits shown in FIGS. 4, 6, 11, and 12 can be realized by a simple transistor circuit shown in FIG. 13A.

That is, reference numeral 201 denotes a group of NPN transistors of the emitter coupling type; 211 to 213 NPN transistors; 202 a constant current source; 203 an output terminal; and 205, 206, and 207 input terminals. (However, FIG. 13A shows the case of three inputs.)

It is now assumed that voltages at the terminals 205, 206, and 207 are set to $V_1$, $V_2$, and $V_3$ and an output voltage at the terminal 203 is set to $V_0$.

Figure 13B:
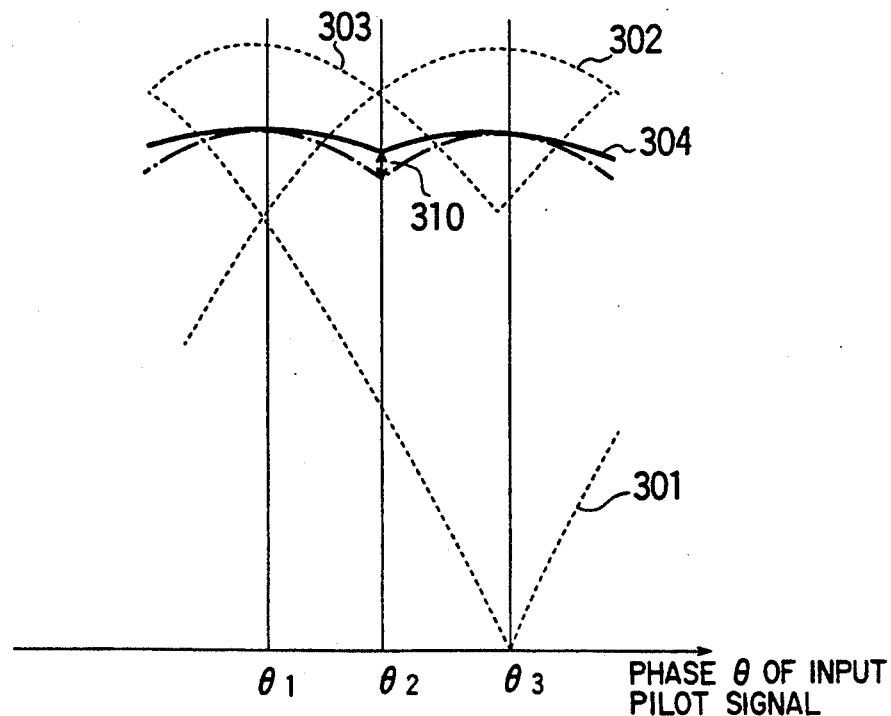

FIG. 13B shows an operation principle waveform and explanation will now be made with reference to the waveform.

Signals 301, 302, and 303 shown in FIG. 13B are supplied to the input terminals 205, 206, and 207, respectively.

When $\theta = \theta_1$, only the NPN transistor 213 is conductive, so that the output $V_0$ at that time is $$V_3 - KT/q \cdot 1_n(I_E/I_s) = V_3 - KT/q \cdot 1_n(I_0/I_s)$$

where, K:
Boltzmann's constant
K: absolute temperature
q: charges of electrons
$I_s$: saturation current
$I_E$: emitter current, $I_E = I_0$ in this case By practically substituting constants $KT/q = 0.026$ (V), $I_0 = 50$ ($\mu$A), and $I_s = 2.2 \times 10^{-6}$ (A), $V_0 = V_3 - 0.6799$ (V).

When $\theta = \theta_3$, only the NPN transistor 212 is conductive. Therefore, the output $V_0$ at that time is $$V_2 - KT/q \cdot 1_n(I_E/I_s) = V_2 - KT/q \cdot 1_n(I_0/I_s)$$

where, $I_E = I_0$ in this case.

In a manner similar to the above, by substituting the constants, $V_0 = V_2 - 0.6799$ (V).

On the other hand, when $\theta = \theta_2$, $V_3 = V_2$ and the NPN transistors 213 and 212 are made conductive and their emitter currents are set to $I_0/2$.

At that time, the output $V_0$ is $$V_3 - KT/q \cdot 1_n(I_0/2/I_s) \text{ or}$$

$$V_2 - KT/q \cdot 1_n(I_0/2/I_s)$$

As compared with the cases where $\theta = \theta_1$ and $\theta = \theta_3$, the base emitter voltage VBE ($= KT/q \cdot 1_n(I_0/2/I_2)$) of each of the NPN transistors 213 and 212 decreases by only $\Delta V$.

When $\theta_1 < \theta < \theta_3$, the current $I_0$ is respectively distributed as emitter currents of the transistors 213 and 212 and the voltage $V_{BE}$ is smaller than the case where $\theta = \theta_1 = \theta_3$.

As a result, the output $V_0$ has a waveform in which the ripple component is improved as shown by a solid line in FIG. 13B.

When $\Delta V$ is actually obtained, $$\Delta V = KT/q \cdot 1_n(I_0/I_s) - KT/q \cdot 1_n(I_0/2/I_s)$$

By practically substituting the constants in a manner similar to the above, $\Delta V = 18.0$ mV.

Therefore, by using the construction of FIG. 13A for the maximum value circuit as a component element of the tracking error detecting circuit, the output signal ripple can be reduced by the above reason. Further, the vector synthesis error for the input signal phase can be reduced and the above construction is extremely effective.

Lastly, the sixth embodiment of the invention will now be described in accordance with a block diagram of a main section of FIG. 14.

Figure 14:
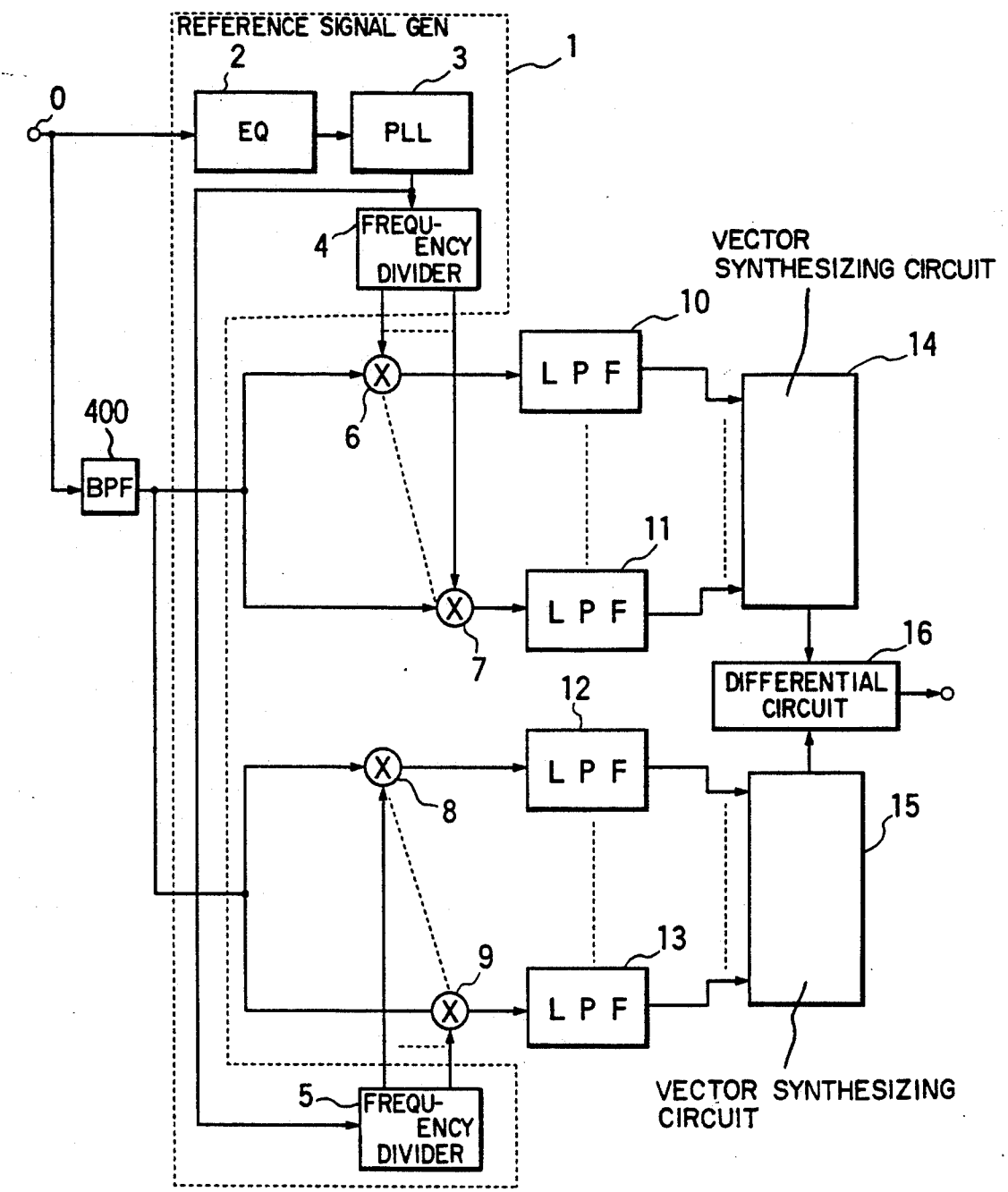
FIG. 14 is a diagram showing a block of a main section of a tracking error detecting circuit in the sixth embodiment of the invention.

FIG. 14 differs from FIG. 1 with respect to points that a BPF 400 is inserted for an input and that waveforms of three values are used as output waveforms of the reference signals having the same frequencies as those of the pilot signals generated from the frequency dividers 4 and 5 and whose phases differ.

That is, in FIG. 1, there is a problem such that in the case where the frequency dividers 4 and 5 are constructed by digital frequency dividing circuits, signals of square waveforms are generated from the frequency dividers 4 and 5 and the odd-number order harmonics components exist. Therefore, in the case where the multiplications have been performed by the multipliers 6, 7, 8, and 9, since the frequency band in which no pilot signal exists is converted into a band near the direct current by the odd-number order harmonics, problems such that the amplitude value of the pilot signal cannot be accurately detected and the like occur.

Therefore, by inserting the BPF 400 after the terminal 0 as shown in FIG. 14 and by previously eliminating the odd-number order harmonics component, such problems are eliminated and the above construction becomes extremely effective constructing means.

In the case where the band of the BPF 400 cannot be narrowed, the waveforms which are generated from the frequency dividers 4 and 5 are set to the waveforms having three values.

Figure 15A:
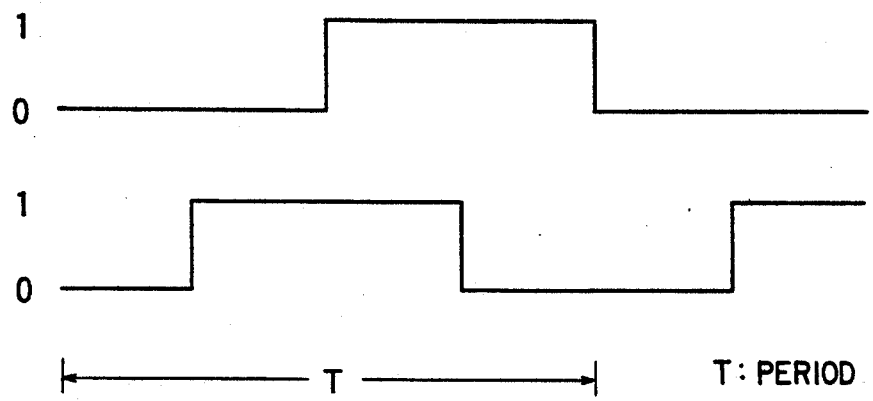
FIGS. 15A and 15B are principle waveform diagrams showing the principle of the sixth embodiment of the invention.
Figure 15B:
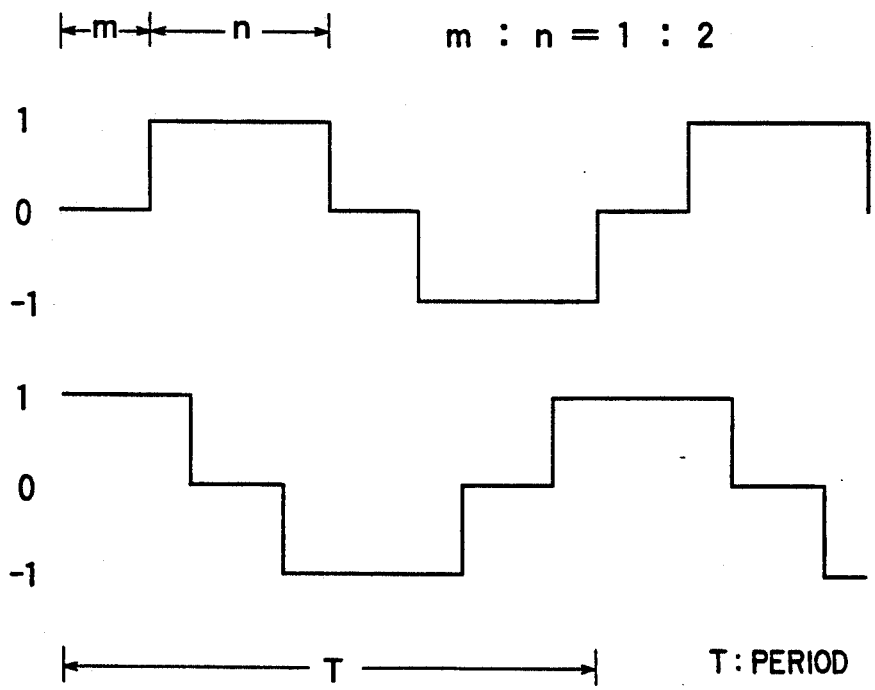

That is, now assuming that the waveform which is generated from the frequency divider 4 or 5 is set to square waves such as two square waves shown in FIG. 15A, two 3-value waveforms shown in FIG. 15B are generated in place of the square waves. In the above case, however, as shown in FIG. 15B, the waveforms which satisfy the duty ratio m: n=1:2 are generated.

As mentioned above, by generating the waveforms as shown in FIG. 15B, the third-order harmonics component among the odd-number order harmonics becomes infinitesimal and only the harmonics components of fifth order or higher exist.

Returning to FIG. 14, therefore, assuming that the waveforms which are generated from the frequency dividers 4 and 5 are set to the 3-value waveforms shown in FIG. 15B, it is sufficient for the BPF 400 to merely eliminate the frequency band of fifth order or higher and there is no need to provide a sharp BPF. The above construction becomes extremely effective constructing means.

Although FIG. 14 has been described with respect to the case of the construction in which one BPF 400 is inserted, one BPF for each pilot signal, namely, total two BPFs can be also inserted. In such a case, the band of the BPF can be easily set.

We claim:

1. A tracking error detecting circuit of a magnetic recording and reproducing apparatus in which pilot signals of different frequencies to detect a tracking error are added to a video signal and recorded to each track on magnetic recording medium by a recording and reproducing magnetic head, and when a predetermined recording track is reproduced by the recording and reproducing magnetic head, reproduction output levels of the pilot signals reproduced as crosstalks from both of the adjacent tracks are compared, and the tracking error is detected, comprising:

a reference signal generating circuit for generating two sets of two amplitude detection reference signals having the same frequencies as those of said adjacent pilot signals and whose phases are different by 90°;

two sets of two multiplying circuits for multiplying outputs from the reference signal generating circuit and the reproduction output from the recording and reproducing magnetic head;

two sets of two LPFs for eliminating components other than the amplitude detection signals of the pilot signals from outputs of the multiplying circuits;

two sets of vector synthesizing circuits for synthesizing the outputs of the LPFs to amplitude values of the normal pilot signals; and a differential circuit for obtaining difference between the signals generated from said two sets of vector synthesizing circuits and for detecting the tracking error.

2. A tracking error detecting circuit according to claim 1, wherein said video signal is a digital signal, the tracking error detecting pilot signals having different frequencies every track which are fractions of integers of a clock frequency of the digital signal are added to the digital signal and recorded onto the magnetic recording medium, and upon reproduction, the reproduction output levels of the pilot signals reproduced as crosstalks from both of the adjacent tracks are compared, and the tracking error is detected, wherein the reference signal generating circuit (1) comprises:

an EQ (equalizer) for compensating frequency characteristics;

a PLL circuit for generating reproduction clocks; and two frequency dividers for frequency dividing an output of the PLL circuit and for generating two sets of two amplitude detection reference signals having the same frequencies as those of the pilot signals and whose phases are different by 90°.

3. A tracking error detecting circuit according to claim 1, wherein said vector synthesizing circuit comprises:

two square circuits for squaring the output of the LPFs;

an adding circuit for adding outputs of the two square circuits; and a square root circuit for generating a square root value of an output of the adding circuit, and wherein the vector separated amplitude values of the pilot signal are vector synthesized and detected.

4. A tracking error detecting circuit according to claim 1, wherein said two sets of two LPFs are constructed so as to respectively generate two non-inverting and inverting signals, and said vector synthesizing circuit comprises:

an oscillating circuit for generating a reference signal;

a 4-signal switching circuit for switching four signals generated from said two LPFs in accordance with an output of said oscillating circuit;

a BPF for detecting signals indicative of amplitude values of the pilot signals from an output of the 4-signal switching circuit;

a detecting circuit for detecting the amplitude values of the pilot signals from an output of the BPF;

an LPF for eliminating unnecessary components other than the amplitude values of the pilot signals from an output of the detecting circuit.

5. A tracking error detecting circuit according to claim 1, wherein said two sets of two LPFs are constructed so as to respectively generate two non-inverting and inverting signals, and said vector synthesizing circuit comprises:

two maximum value circuits for detecting the maximum values from the outputs of the LPFs;

an adding circuit for adding outputs of said two maximum value circuits;

a 1/A time multiplying circuit for multiplying 1/A time to an output of said adding circuit and for standardizing so as to have an amplitude level which is equal to that of the output of said maximum value circuit; and a maximum value circuit for detecting the maximum value from the outputs of said two maximum value circuits and the output of said 1/A time multiplying circuit.

6. A tracking error detecting circuit according to claim 5, wherein said maximum value circuit is constructed by NPN transistors in which bases are set to inputs and emitters are commonly connected and outputs are taken out from the emitters.

7. A tracking error detecting circuit according to claim 1, wherein said maximum value circuit is constructed by NPN transistors in which bases are set to inputs and emitters are commonly connected and outputs are taken out from the emitters.

8. A tracking error detecting circuit of a magnetic recording and reproducing apparatus, in which pilot signals of different frequencies to detect a tracking error are added to a video signal and recorded to each track on a magnetic recording medium by a recording and reproducing magnetic head, and when a predetermined recording track is reproduced by the recording and reproducing magnetic head, reproduction output levels of the pilot signals reproduced as crosstalks from both of the adjacent tracks are compared, and the tracking error is detected, comprising:

a reference signal generating circuit for generating two sets of n amplitude detection reference signals having the same frequencies as those of the pilot signals and whose phases are different;

two sets of n multiplying circuits for multiplying outputs from the reference signal generating circuit and the reproduction output from the recording and reproducing magnetic head;

two sets of n LPFs, for eliminating components other than the amplitude detection signals of the pilot signals from outputs of said multiplying circuits;

two sets of vector synthesizing circuits for synthesizing outputs of said LPFs to the amplitude values of the normal pilot signals; and a differential circuit for calculating a difference between the signals generated from the two sets of vector synthesizing circuits and for detecting the tracking error.

9. A tracking error detecting circuit according to claim 8, wherein in the case where the two sets of n amplitude detection reference signals which are generated from the reference signal generating circuit are square wave outputs, a BPF for eliminating unnecessary DC components which are caused from odd-number order harmonics of the square wave signals by multiplying said two sets of n square wave signals is inserted before the two sets of n multiplying circuits.

10. A tracking error detecting circuit according to claim 8, wherein the two sets of n amplitude detection reference signals which are generated from the reference signal generating circuit are 3-value square wave signals having a duty ratio of 1:2, and a BPF (400) for eliminating unnecessary components which are caused from odd-number order harmonics of fifth order or higher which are caused from the 3-value square wave signals is inserted before the two sets of n multiplying circuits.

- 11. A tracking error detecting circuit according to claim 8, wherein said vector synthesizing circuit comprises n absolute value circuits for detecting absolute values from the outputs of the LPFs and an adding circuit for adding outputs of said n absolute value circuits.

12. A tracking error detecting circuit according to claim 8, wherein said two sets of n LPFs are constructed so as to respectively generate two non-inverting signal and inverting signal, and said two sets of vector synthesizing circuits comprise maximum value circuits for detecting the maximum values from the outputs of said n LPFs.

* * * * *